Oct. 14, 1969  H. A. SCHWARTZ  3,472,579
MULTIPROGRAM PROJECTION APPARATUS
Filed June 10, 1966  10 Sheets-Sheet 1

INVENTOR.
HENRY A. SCHWARTZ
BY
Leonard H. King
ATTORNEY.

Oct. 14, 1969     H. A. SCHWARTZ     3,472,579

MULTIPROGRAM PROJECTION APPARATUS

Filed June 10, 1966     10 Sheets-Sheet 2

INVENTOR.
HENRY A. SCHWARTZ

BY Leonard H. King

ATTORNEY.

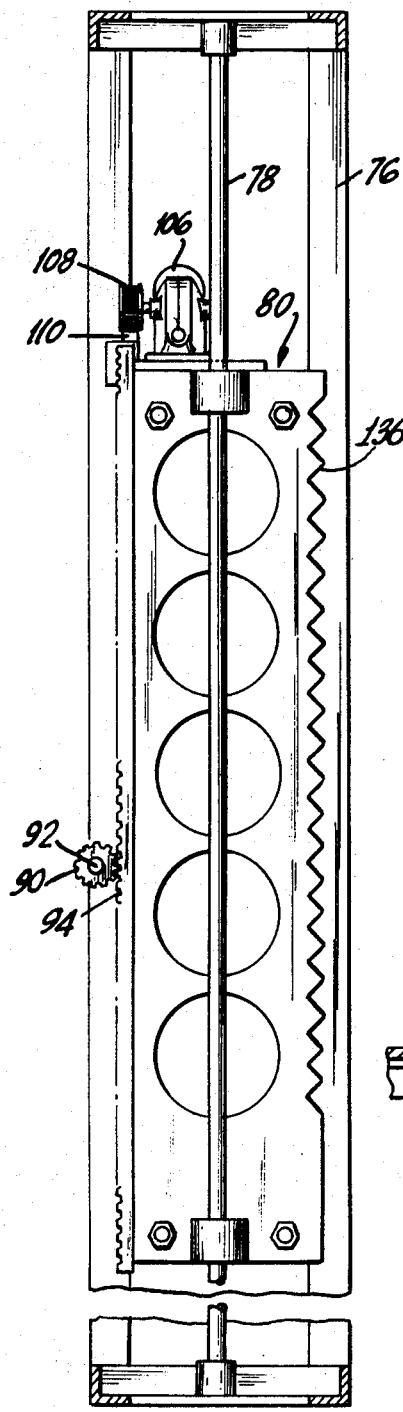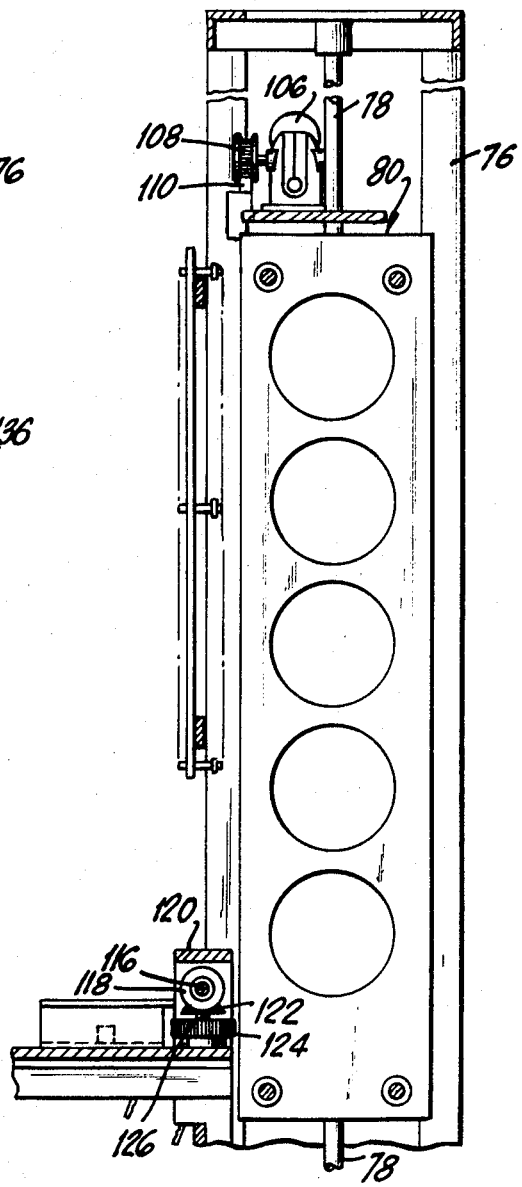
FIG.8
FIG.9

Oct. 14, 1969  H. A. SCHWARTZ  3,472,579
MULTIPROGRAM PROJECTION APPARATUS
Filed June 10, 1966  10 Sheets-Sheet 5

INVENTOR.
HENRY A. SCHWARTZ
BY
Leonard H. King
ATTORNEY.

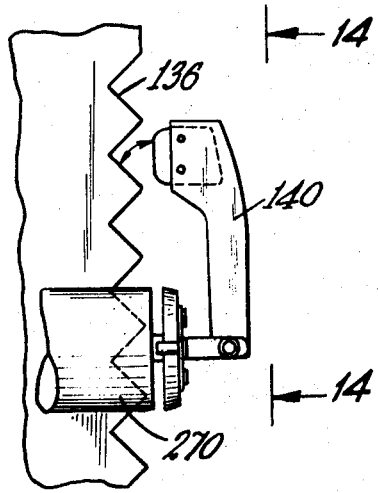
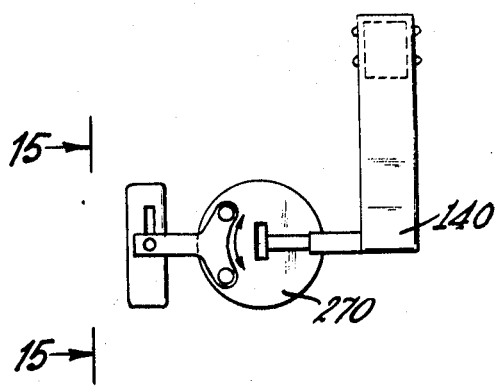
FIG.13  FIG.14
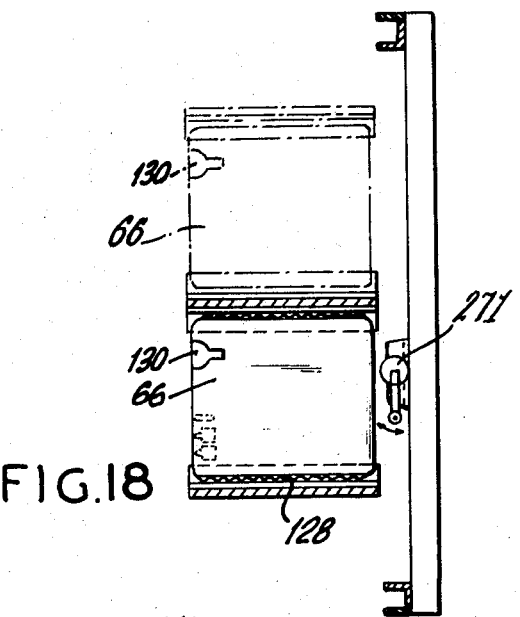
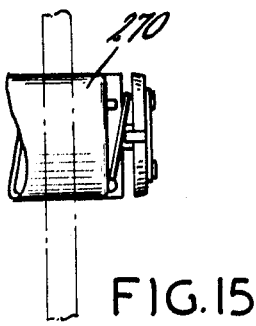
FIG.15
FIG.18
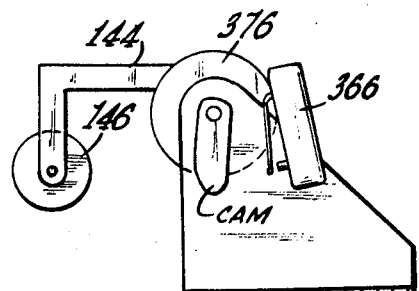
FIG.16
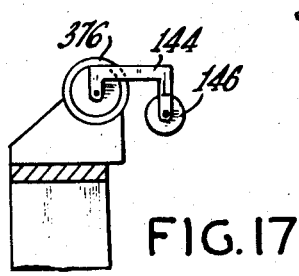
FIG.17
INVENTOR.
HENRY A. SCHWARTZ
BY Leonard H. King
ATTORNEY.

Oct. 14, 1969   H. A. SCHWARTZ   3,472,579
MULTIPROGRAM PROJECTION APPARATUS
Filed June 10, 1966   10 Sheets-Sheet 8
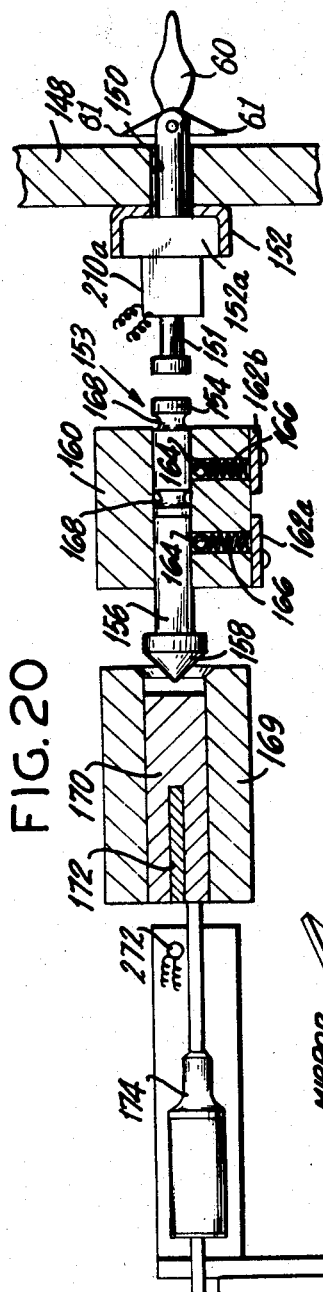
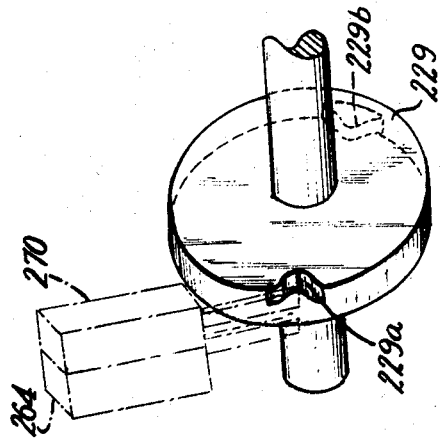
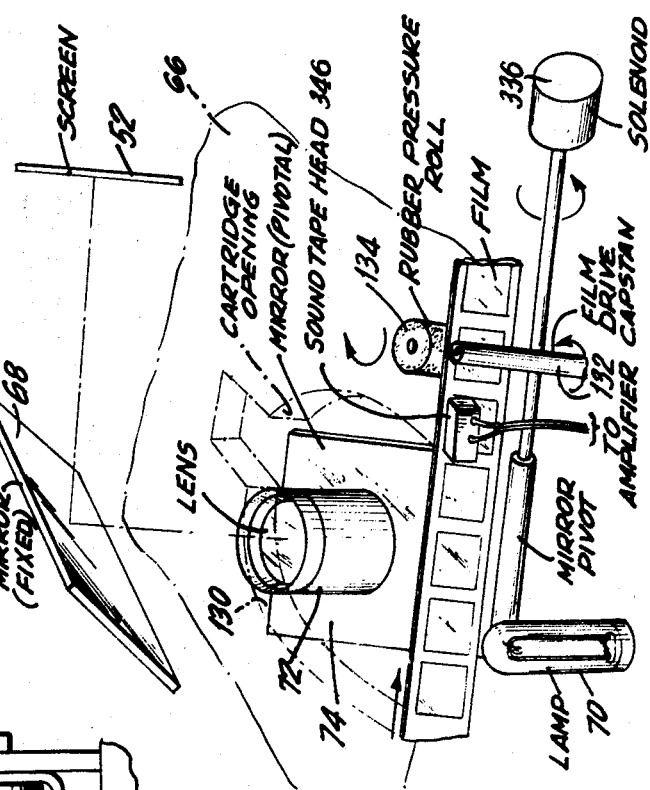
INVENTOR.
HENRY A. SCHWARTZ
BY Leonard H. King
ATTORNEY.

United States Patent Office 3,472,579
Patented Oct. 14, 1969

3,472,579
MULTIPROGRAM PROTECTION APPARATUS
Henry A. Schwartz, Valley Stream, N.Y., assignor, by mesne assignments, to Color-Sonics, Inc., New York, N.Y., a corporation of Delaware
Filed June 10, 1966, Ser. No. 556,651
Int. Cl. G03b 21/56
U.S. Cl. 352—123                                23 Claims

ABSTRACT OF THE DISCLOSURE

Multiprogram projection apparatus including an elevator in which a plurality of film cartridges are stored in a vertical stack, for horizontal ejection from the elevator. The elevator is mounted for vertical movement past a stationary projection station so that a selected film cartridge may be positioned in registry with the projection station. Transport mechanism is provided to eject the selected cartridge, horizontally, from the elevator to the projection station. The elevator may carry a number of cartridge stacks in a horizontal array and means are provided for moving the elevator horizontally to register the desired vertical stack with the projection apparatus.

---

This invention relates generally to motion picture projectors and more particularly to a projector containing a plurality of endless film cartridges that may be individually selected for showing.

Multicartridge film projectors are old in the art. Various structures have been provided for storing and selecting individual cartridges. The prior art structures frequently employed rotating drums and conveyor belts on which the cartridges were mounted. Still other prior art structures provided a sliding or horizontally movable carriage that transported the cartridges to the projection station. In order to provide a sufficient number of different cartridges, the prior art units were very bulky and, of necessity, could not provide esthetic appeal. One machine now on the market is so large that it will not fit through the normal or average size doorway. Accordingly, the location of the cabinet was limited.

The prior art is also characterized by very complex circuitry and mechanisms for selecting and transporting individual cartridges. These devices are very costly and have only a limited reliability because they are subject to frequent malfunction. The complexity of the prior art devices also limited, for practical purposes, their utility as a "juke box" type of installation. It has in the past been found difficult to provide a projector that will withstand the abuse inherent in a coin-actuated machine available and operated by the general public.

By way of contrast, the present invention employs a cabinet having minimum outside dimensions. A commercially available projection system such as the Fairchild Camera and Instrument Corp. 8 mm. Mark IV/V automatic cartridge projector may be utilized in this system. The Fairchild system includes a projection lamp, a first reflecting mirror that is pivotally mounted and a lens system. A second fixed, reflecting mirror and a viewing screen are integral with the cabinet. The cartridges used with the present invention are of the type having a single spool wherein the film is driven by a capstan and is recirculated; that is, the film traverses the projection system at the periphery of the spool and thereafter returns to a storage portion proximate to the center of the spool. In one embodiment, the cartridges are horizontally disposed in two, side-by-side vertical stacks and are slidably arranged in guide rails in a carriage that is movable in two mutually perpendicular directions.

In the embodiment illustrated in the accompanying drawing, the carriage is moved horizontally so that either one of the two vertical stacks of cartridges is in opposition to the projector system. The carriage is also vertically movable by an elevator so that a particular cartridge may be selected from the stack that is in projecting position. Side-by-side vertical stacks of cartridges are illustrated and will be described. However, it is evident that only a single vertical stack may be used. In this case, horizontal carriage motion is not required. The cabinet would be smaller than the double stack cabinet but of course fewer cartridges would be available. In both embodiments, a single, externally movable lever is moved vertically to properly position the cartridge selector apparatus. At that time, any one of either two or four horizontally aligned pushbuttons are depressed to select the one cartridge for playing.

The structure that will be described in detail hereinafter is well suited for coin-operated, multiprogram operation. A simple electrical circuit sets the carriage and the elevator in motion whereby the desired program is placed in the projection station. Indexing means are provided so that the vertical movement of the carriage is positive and well controlled. Where two vertical stacks of cartridge are used, the extent of the horizontal movement of the carriage is controlled by suitably positioned limit switches. When properly positioned, the cartridge selected is positively ejected from the cartridge guide rails and driven into the projection station. Means are also included for automatically returning the cartridge to its normal position within the guide rails after a complete showing.

While the present application refers to a coin-operated system, it should be understood that the device has utility for educational and informational purposes where the coin control may be dispensed with or by-passed by a jumper wire or key-controlled switch.

Accordingly, it is an object of this invention to provide an improved cartridge-type multiprogram film projector.

It is another object to provide a device of the aforementioned type wherein the mechanism for selecting cartridges to be played is greatly simplified.

An additional object is to provide a coin-operated multiprogram projector having a cartridge selection mechanism that is inherently trouble-free.

A particular object of this invention is to provide a maximum number of film cartridges in a cabinet of minimum size.

A further object is to provide positive cartridge indexing means.

Yet another object is to provide means for positively ejecting the cartridge towards and away from the projection station.

A particular object of this invention is to provide gear-type ejection and injection means for a cartridge having cooperating gears integral therewith.

Still another object is to provide an improved cartridge having a reproducible program therein, said cartridge having gear means integral therewith that cooperates with cartridge placement means in multiprogram projection apparatus.

Yet another object is to provide auxiliary cartridge placement means that positively locates the cartridge in the projection station.

A further object is to provide auxiliary cartridge ejection means that positively removes the cartridge from the projection station.

An additional object of this invention is to provide apparatus that moves the cartridges both horizontally and vertically in three mutually perpendicular planes.

These and other features, objects and advantages of the invention will, in part, be pointed out with particularity and will, in part, become obvious from the following more detailed description of the invention taken in conjunction with the accompanying drawing which forms a part thereof.

In the various figures of the drawing, like reference characters designate like parts.

In the drawing:

FIG. 8 is a sectional end elevational view taken along line 8—8 of FIG. 4 showing vertical drive means and indexing means for the cartridge carriage;

FIG. 9 is a fragmentary sectional elevational view taken along line 9—9 of FIG. 4 illustrating the mechanism associated with the locating of the cartridge within the projection station;

FIG. 13 is a fragmentary, elevational view of indexing means utilized with the elevator structure of this invention;

FIG. 14 is a fragmentary elevational view taken along line 14—14 of FIG. 13;

FIG. 15 is an elevational view taken along line 15—15 of FIG. 14;

FIG. 16 is an elevational view of cartridge positioning means;

FIG. 17 is an elevational view opposite to FIG. 16;

FIG. 18 is a fragmentary, sectional plan view of the cartridge and the ejection means associated therewith;

FIG. 20 is a plan view taken along line 20—20 of FIG. 19;

FIG. 21 is a perspective showing of a cam and switch arrangement;

FIG. 22 is a partial schematic, partially perspective view of elements of the projection system;

Figure 1:
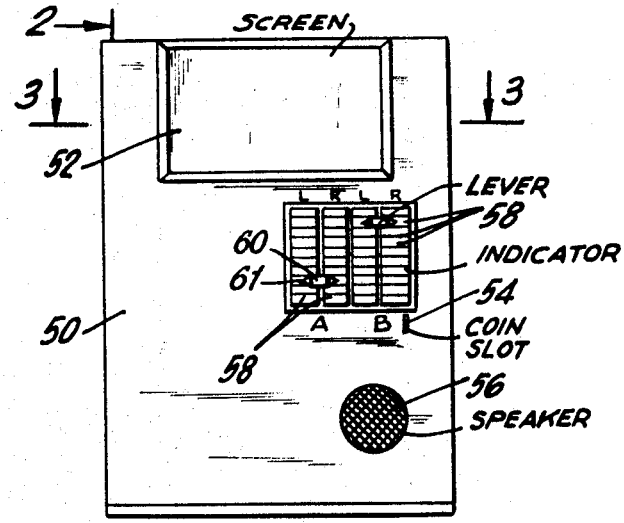
FIG. 1 is a schematic front elevation view of the projection device included in this invention.
Figure 2:
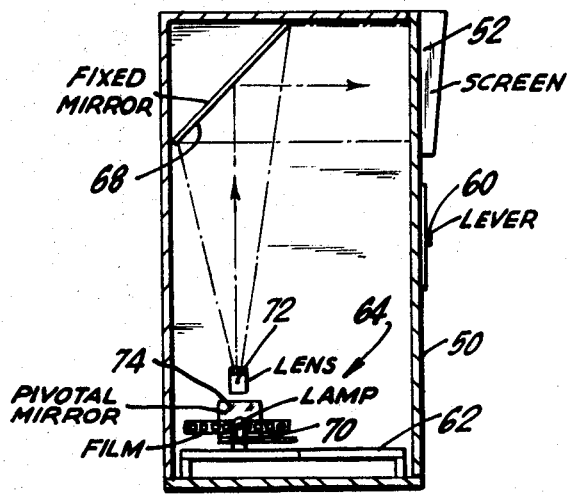
FIG. 2 is a side elevational view taken along line 2—2 of FIG. 1.
Figure 3:
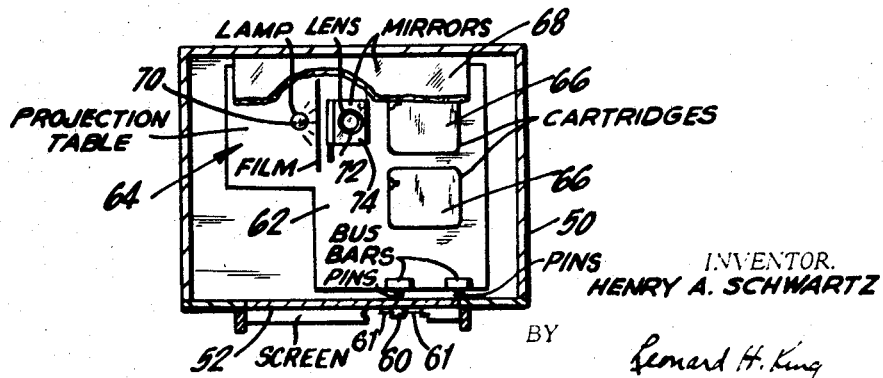
FIG. 3 is a schematic plan view taken along line 3—3 of FIG. 2.

Referring now to the drawing, FIGS. 1, 2 and 3 will be utilized to orient some of the major elements comprising this invention. The front surface of cabinet 50 is provided with a large, rear projection, viewing screen 52, a receptacle 54 to receive the coins that operate the system, and a speaker 56. The front surface in one embodiment of the invention also includes four side-by-side columns of pushbuttons 58 which, in cooperation with a vertically movable lever 60, are used to select the program to be viewed.

Internally, the cabinet is provided with a deck 62 that includes a projection system 64 (FIG. 22). A selected one of a number of endless tape cartridges 66 is delivered to the projection system so that the subject matter on the film may be projected to a fixed mirror 68 and then to the viewing screen 52. The projection system on deck 62 is comprised of a lamp 70, a lens assembly 72, and a pivotal mirror 74 that is electrically actuated whereby it is in position to reflect an image from the passing film to the fixed mirror.

Figure 4:
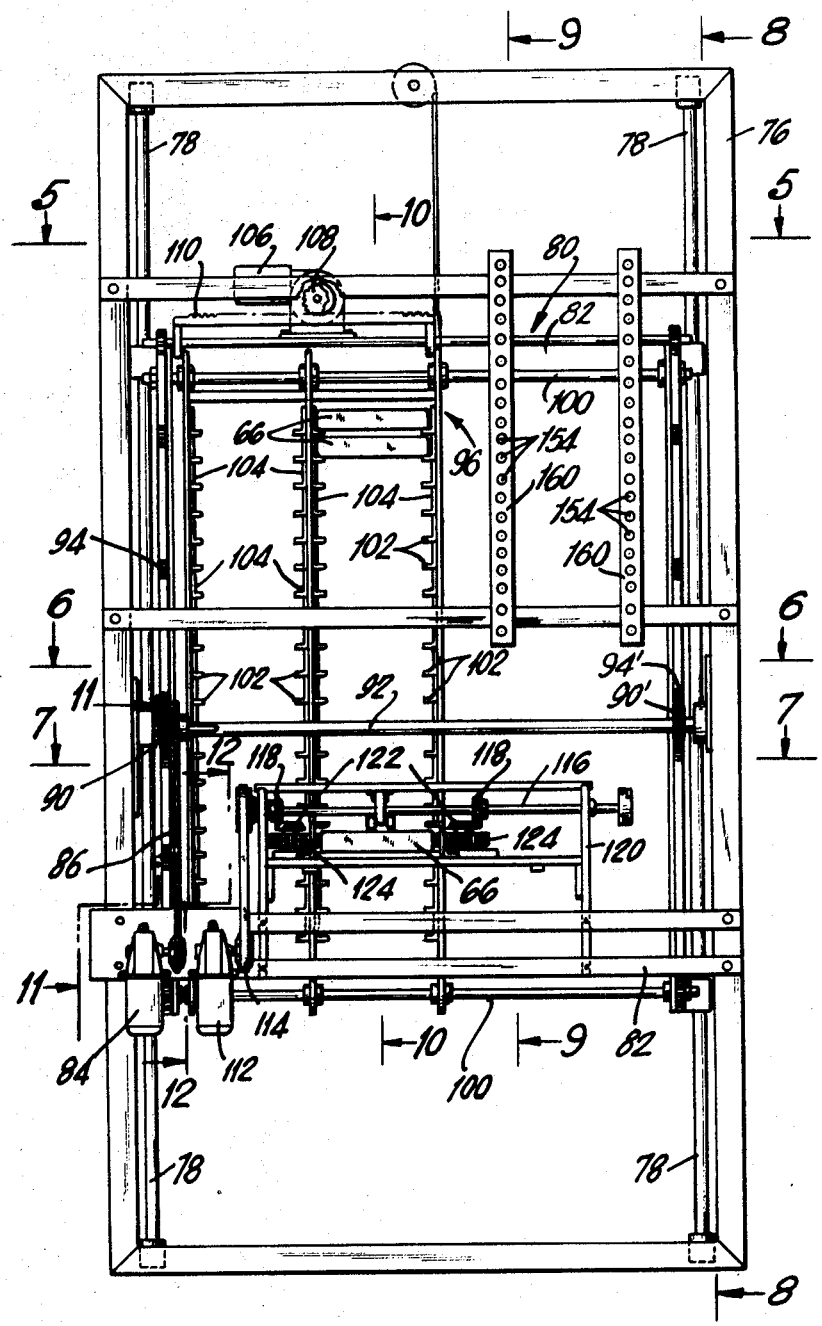
FIG. 4 is a front elevational view of the present invention with the cabinet and the projection system removed.
Figure 5:
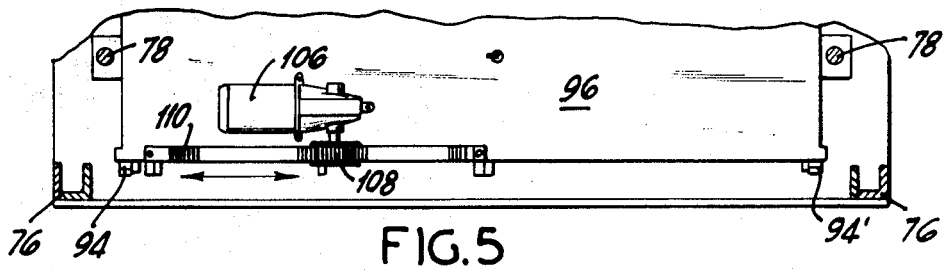
FIG. 5 is a fragmentary sectional plan view taken along line 5—5 of FIG. 4 and illustrating means for horizontally locating the cartridge carriage.
Figure 6:
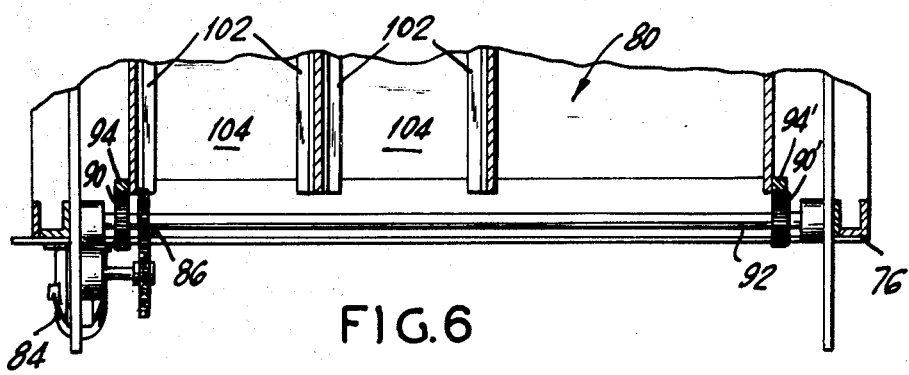
FIG. 6 is a fragmentary sectional plan view taken along line 6—6 of FIG. 4 illustrating means for vertically displacing the cartridge carriage.
Figure 7:
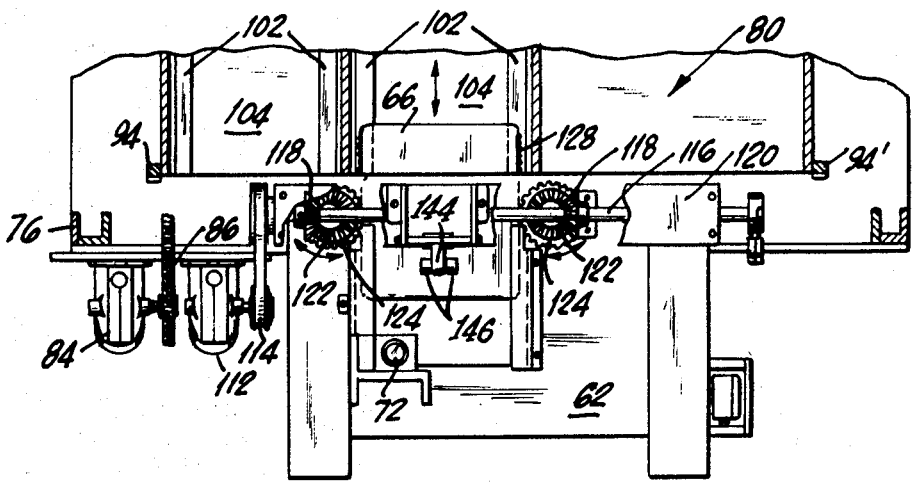
FIG. 7 is a fragmentary sectional plan view taken along line 7—7 of FIG. 4 illustrating means to position the cartridge within the projection station.
Figure 10:
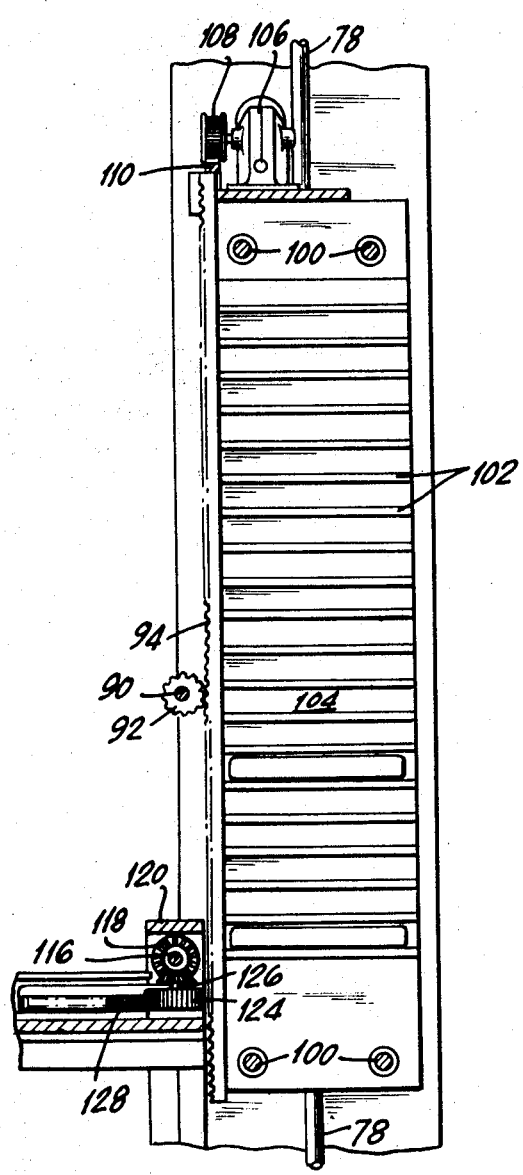
FIG. 10 is a sectional elevational view taken along line 10—10 of FIG. 4 illustrating the vertical arrangement of the cartridges.
Figure 11:
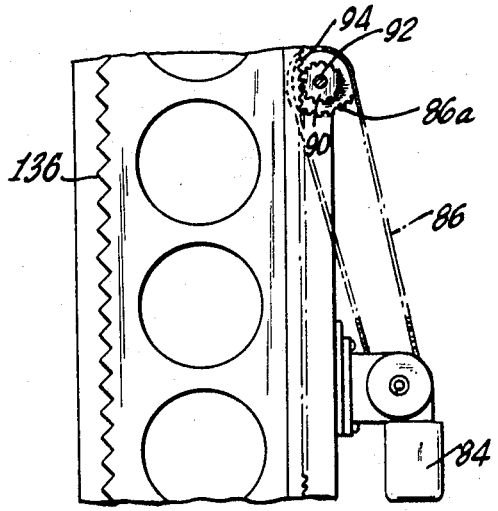
FIG. 11 is a fragmentary sectional side elevational view taken along line 11—11 of FIG. 4 showing the vertical drive means for the cartridge carriage.
Figure 12:
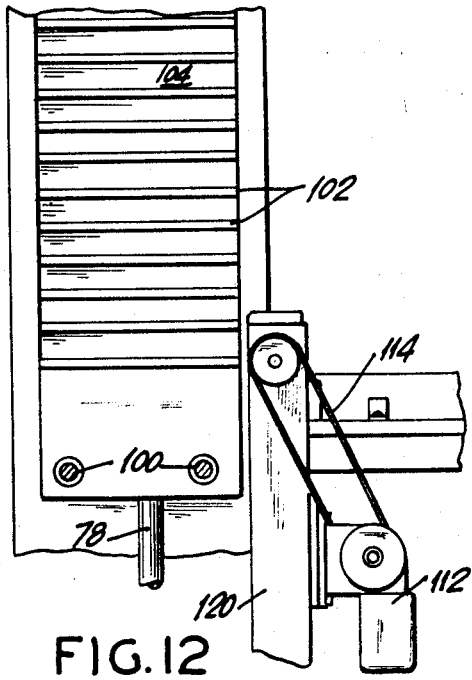
FIG. 12 is a fragmentary sectional side elevational view taken along line 12—12 of FIG. 4 showing the drive means for positioning the cartridge at the projection station.

In FIG. 4 of the drawing, it will be seen that the internal structure of the present apparatus is comprised of a structural support member 76 at the sides of which are mounted a pair of vertical rods 78. Elevator 80 is vertically movable with respect to the support member by means of a frame 82 slidably mounted on the vertical rods. Bearings are provided in the upper and lower ends of the elevator, at the sides thereof, so that the frame may move smoothly on the guide rods. Motor 84 (FIG. 4 and FIG. 11) is arranged to drive the elevator along its vertical path. As may be seen in FIG. 11, motor 84 drives a belt 86 that is trained around a sprocket 88. Gear 90 and sprocket 82 are both mounted on transverse shaft 92 whereby the gear is in engagement with a rack member 94 integrally affixed to the elevator structure. A like gear and rack arrangement 90' and 94' is also provided on the other side of the elevator, as shown in FIG. 4.

Mounted within the elevator is an independent, transversely movable carriage 96. The carriage is comprised of vertical support members 98 horizontally slidable on guide rods 100 fixed in the elevator. The carriage also has a plurality of horizontal guide rails 102 extending between the front and back of the machine. The guide rails define a number of pockets 104, each of which slidably holds one of the cartridges 66.

A second motor 106 mounted on the frame of the machine has a drive pinion 108 secured thereto, the pinion being arranged to meshingly engage a rack gear 110 integral with the top of the carriage. Motor 106 is adapted to move the carriage horizontally along the guide rods 100 so that either one of the vertical rows of cartridge guide rails is in opposition to the projection system.

Assuming that the desired vertical stack has been selected by moving the carriage horizontally and that the cartridge within the selected stack has been properly positioned by moving the elevator vertically, the following mechanism is designed to eject the cartridge into the projection station. A motor 112 is arranged through a belt and pulley system 114 to drive a transverse shaft 116 mounted in front of the elevator and the two vertical stacks of cartridges therein. A pair of spaced bevel gears 118 are mounted on a transverse shaft 116 that is journaled in frame 120. Gears 118 are in engagement with a second pair of bevel gears 122 rotatable at right angles to the axes of shaft 116. The second pair of bevel gears and a pair of spur gears 124 are secured to stub shafts 126 rotatably mounted on horizontal platform 62 whereby the spur gears are spaced apart horizontally by a distance equal to the width of a cartridge. Rack gears 128 formed on the side of the cartridge, as shown in FIG. 18, are arranged to be meshingly engaged by the spur gears.

To summarize briefly, motor 84 drives the elevator vertically to properly position the desired cartridge. Motor 106 horizontally locates the carriage so that the selected cartridge is ready to be injected into the projection system. When the desired cartridge is placed in the position opposite the projector by the combination of motor drives mentioned above, a suitably timed rotary solenoid initiates the removal of the cartridge from the guide rails and positions it in opposition to the projection system. Motor 112 completes the removal of the correctly located cartridge from its pocket in the carriage by means of the rack and gear arrangement mentioned above.

Figure 24A:
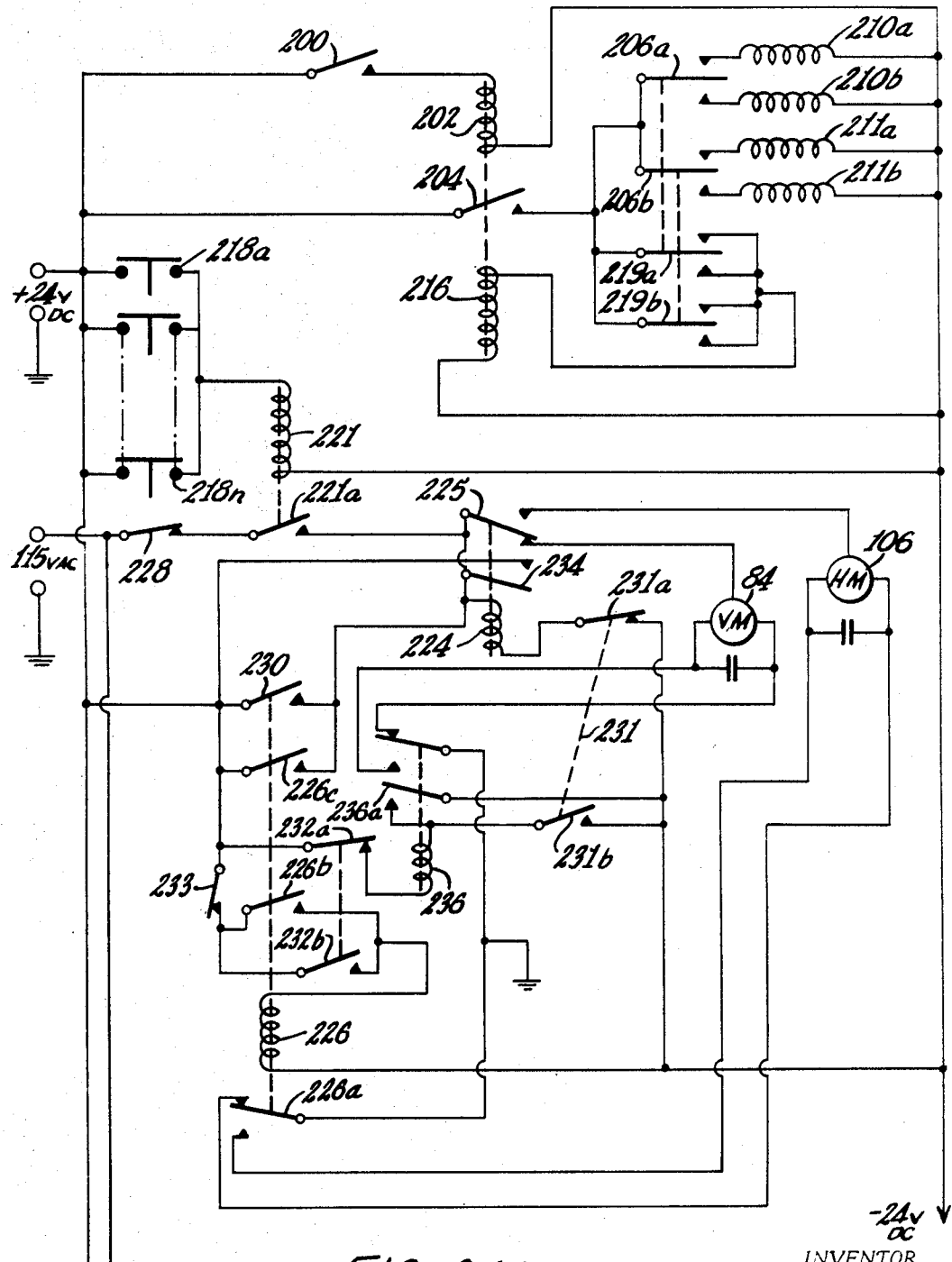
FIG. 24A and 24B is schematic showing of the electrical circuit, the figures being joined along the power buses.
Figure 24B:
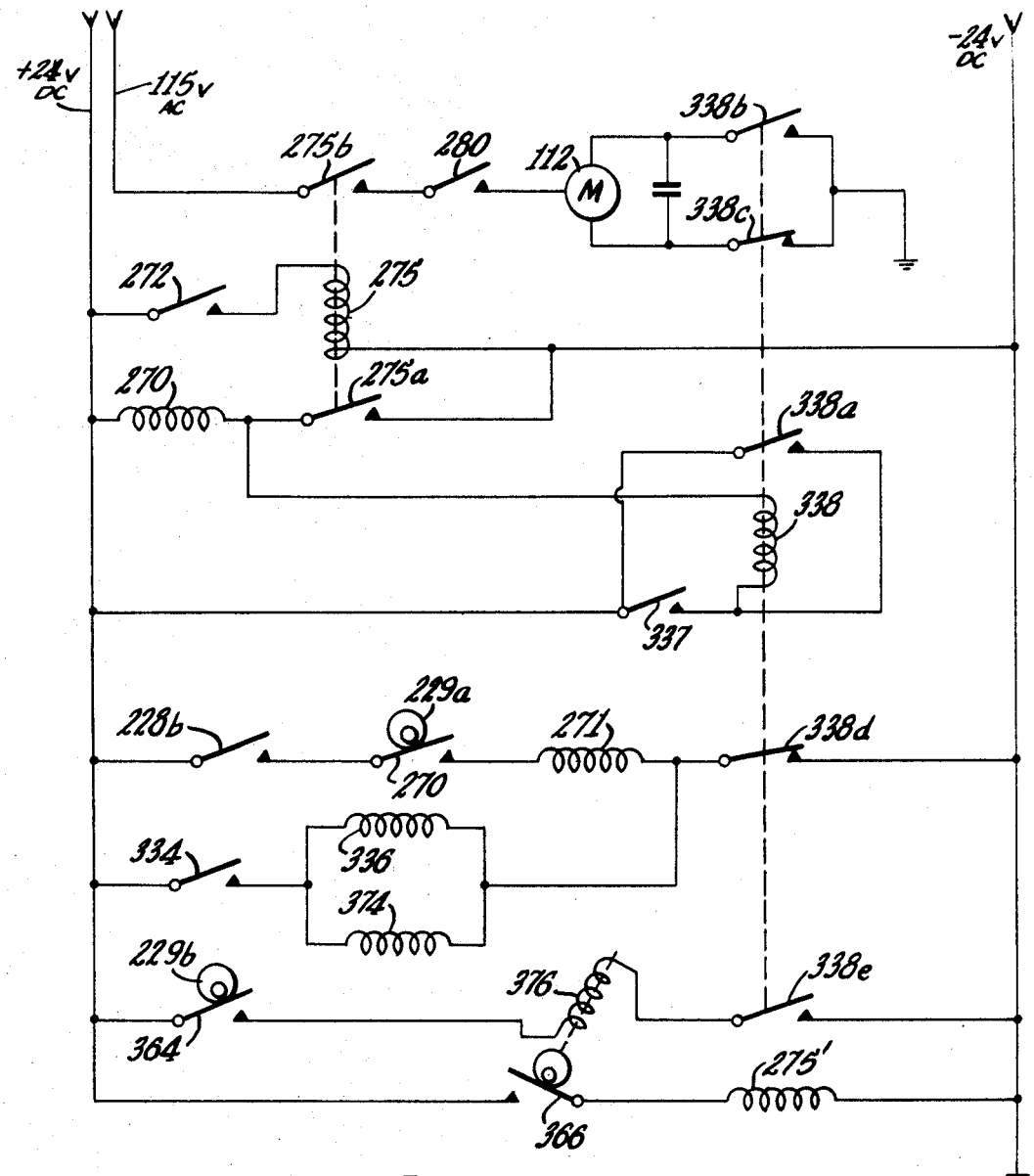

The schematic diagrams of FIG. 24A and FIG. 24B illustrate the basic components of the aforementioned projection system. A solenoid 336 is linked with and arranged to pivotally position mirror 74 within an opening 130 in the cartridge housing. External lamp 70 is positioned on the opposite side of the film running through the cartridge whereby the image on the film is projected from the first pivotal mirror through a lens system 72 to the second fixed mirror 68 at the top of the apparatus. Viewing screen 52 in front of the apparatus receives the image from the second mirror. A motor driven capstan 132 and a cooperating pressure roller 134 advance the film past the lamp and lens assembly of the projection system.

The indexing mechanism that provides vertical stepwise movement of the elevator is shown in FIGS. 8 and 13. A sawtooth edge 136 is formed on the rear vertical surface of one of the frame members and a rotary solenoid 270 having a camming member is provided with a pivotal arm 140 adapted to engage one of the teeth when the elevator is at the proper height. This arrangement assures positive step-by-step movement of the elevator in precise and accurate increments.

When the program is completed, a solenoid 376 is actuated to remove the cartridge from the projection system. Arm 144 is arcuately driven by the solenoid in such a manner that roller 146 thereof bears against the rearward side of the cartridge. Continued movement of arm 144 causes the rollers to push the cartridge towards its pocket 104 in the carriage whereby the rack gears 128 meshingly engage spur gears 124. Motor 112 is reversed and gears 124 drive the cartridge back into its pocket in the elevator carriage.

Means for electrically selecting the cartridge to be played is shown in FIGS. 19, 20, 23, 24 and 25. Door 148 is provided with a pair of elongated slots 150 through which the selector levers 60 project. The levers are moved up and down by the customer to indicate by means of pointers 61 the horizontal plane from which he wishes to select the cartridge. The internal end of each of the selector levers is connected to two vertically movable slotted channels 152 carrying frame 152a on which a pair of solenoids 210a, 210b, or 211a, 211b are mounted, one above the other. The plungers 151 of these solenoids are in opposition to a bank of axially slidable pins 153. A first section 154 of the pin that is directly in opposition to the solenoid plunger is conductive. The opposite end 156 of the pin is nonconductive and may be made of nylon or other suitable material. A tapered head 158 is provided on the nonconductive end of the pin. It will be seen in FIG. 20 particularly that the pin 153 is slidable within a bus bar 160 which includes a pair of brass strips 162a and 162b. Steel balls 164 are captured within the bus bar and are biased by springs 166 whereby when the pin is moved by the solenoid, the balls will engage annular recesses 168 in the conductive portion thereof. In the embodiment illustrated, there are twenty such pins provided, although it is to be understood that the present invention is not limited to any particular number.

Figure 19:
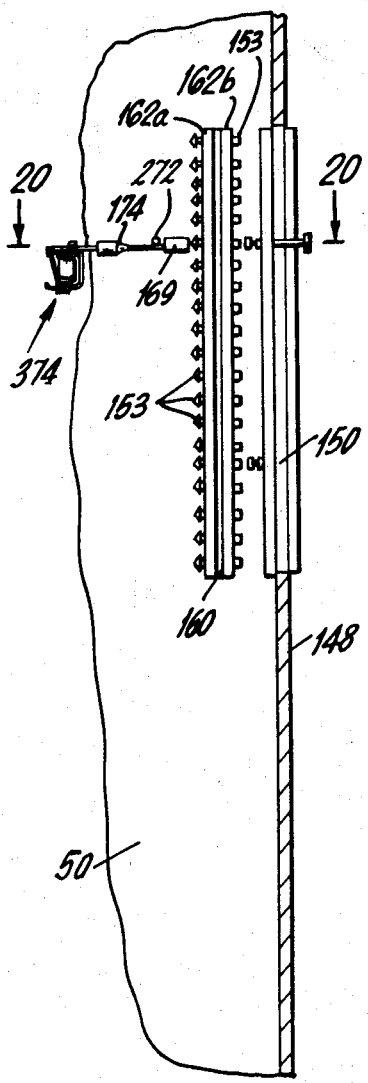
FIG. 19 is a fragmentary sectional side elevational view, partly schematic, illustrating a portion of the program section means.
Figure 23:
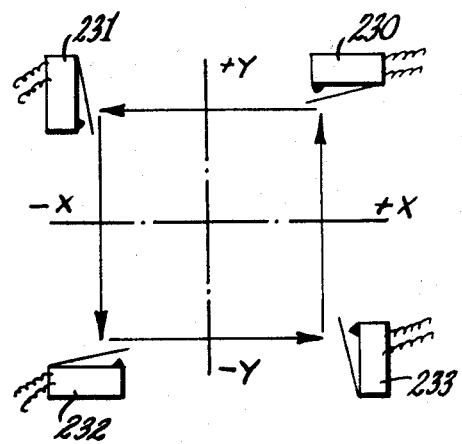
FIG. 23 is a schematic showing of an x—y search pattern.
Figure 25:
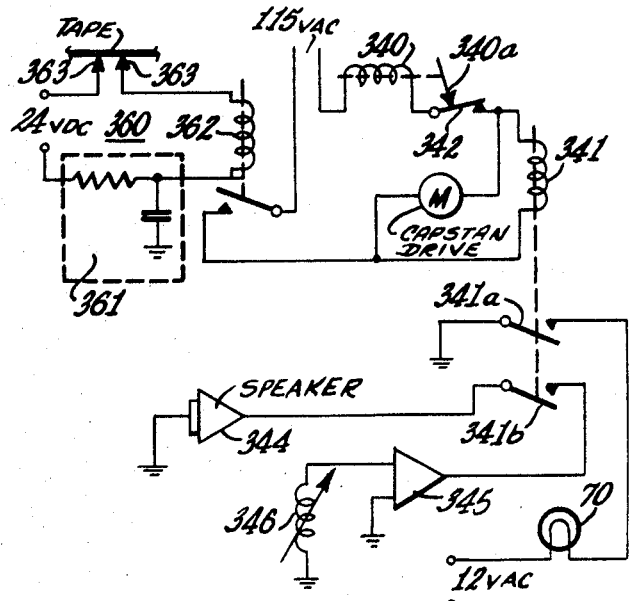
FIG. 25 is a schematic showing of the electrical interlock between the projector and cartridge handling elements of the system.

The headed end 158 of the pin is arranged to enter a block 169 in order to axially displace a magnet 170 associated with each pin 153. In the interest of clarity only one magnet is shown in FIG. 19. A core piece 172 included in the body of the magnet is used to focus the magnetic field. When the pin axially displaces the magnet under the urging of the solenoid selected by the lever, a reed relay 272 will be energized. The magnet is connected by linkage 174 to a return solenoid 374. Reed relay 272, linkage 174 and return solenoid 374 are carried as a unit by the elevator.

The circuitry used in connection with this invention may best be understood by reference to the diagram of FIG. 21 and the following description:

One or more coins are inserted in slot 54 of the coin mechanism.

The coin switch 200 is activated by each coin and, in turn, pulses the accumulator relay 202 which stores the counts.

Contact 204 on the accumulator relay 202 is closed indicating that a coin is present in the unit. Contact 204 will remain closed until the supply of deposited coins is exhausted. This contact supplies the 24 D.C. voltage to the selector switches 206a, 206b.

The customer makes a selection by physically moving a lever 60 connected to the selector bar 60a or 60b which mechanically positions the actuator of the pin select solenoids 210a, 210b and 211a, or 211b over the proper pins 154 on the internal panel 160a or 160b.

The customer moves either the left lever 60 or right lever 60 on the outside panel of either Group A selections or Group B selections (see FIG. 1). This action momentarily activates the proper select solenoid 210a, 210b, 211a or 211b which, in turn, mechanically depresses the selected pin 154 on the internal panel 160.

The apparatus, as described, has provision for forty cartridges in two internal vertical stacks of twenty cartridges each. The outside selector panel is comprised of four vertical columns of 10 buttons each. It will be understood that without deviating from the invention, a greater or lesser number of cartridges may be placed in each stack. Likewise, while two selector panels A and B are shown, one for each stack, one selector panel may be used in conjunction with a single stack in which case the horizontal travel components described may be eliminated. On the other hand, a greater number of selector panels may be employed with appropriate provision for indexing horizontally the corresponding number of stacks.

In a single column cartridge storage arrangement, a $+y/-y$ search system would be employed. In the present system, a $+x/-x/+y/-y$ search system shown in FIG. 22 is employed.

With a double column of cartridges in a normal search mode, the carriage would travel up to the top of the travel and instead of reversing itself and going down, it would now move to the left, thereby bringing the second column of cartridges into the projection line. It would then move down along the second column of cartridges until the bottom of its motion and move right to bring the first column of cartridges back into the projection line.

Relay 224 is a relay that controls the voltage to contacts 225 to either the horizontal drive motor 106 or the vertical drive motor 84. Relay 226 is a reversing relay for the horizontal drive motor. Microswitch 230 represents the microswitch at the uppermost portion of the A column travel. Microswitch 231 represents the microswitch at the lefthand upper portion of the horizontal travel. Microswitch 232 represents the microswitch at the lower point of the lefthand travel which is the column B travel going down. Microswitch 233 represents the microswitch at the righthand section of the lowest point which is the carriage moving back to the A column position. So we therefore have a microswitch in each section of the plane of motion; upper right, upper left, lower left and lower right, in that order.

Assume the carriage is at the lowest righthand position (No. 1), then a button depressed for a cartridge on the lower lefthand position say, No. 39, will provide a full search pattern. The carriage will, in its normal position, start moving upward. At the top of its travel, it will reach microswitch 230, a normally open microswitch, which in turn would energize relay 224. Relay 224 removes the voltage from the vertical drive motor and places the electrical connection onto the horizontal drive motor. Therefore, the carriage will stop moving vertically upwards and will start moving horizontally from right to left or from the column A to the column B position.

At the same time that the relay 224 removes the voltage from the vertical drive motor, it also closes a normally open contact 234 which is connected across microswitch 230 so that as the carriage now moves away from the physical position of microswitch 230, the relay 224 will remain energized as a self-holding relay. As the carriage moves from the column A to the column B position, it reaches the column B position and actuates microswitch 231. Microswitch 231 is a two-poled switch (231a normally closed and 231b normally open). The normally closed portion 231b opens and thereby removes the voltage from relay coil 224 which restores the contact to its quiescent position, thereby reenergizing the vertical drive motor. Simultaneously, the normally open portion 231a of microswitch 231 closes and energizes relay coil 236 which reverses the vertical drive motor from its previous upward motion. So at this instant, when the carriage reaches full lefthand travel and microswitch 231a is closed, voltage is removed from the horizontal drive motor and applied to the vertical drive motor. At the same time the system is reversed by virtue of relay coil 236, there is a normally open contact 236a in relay coil 236 which is in parallel with normally open microswitch contacts 231b thus holding relay 236 electrically in the circuit. The carriage will then move downwardly. At the end of its downward travel, depressed button 39 will be sensed. Upon the completion of the play of 39, if selection No. 2 had been made, which is represented in the A column, the carriage would continue its downward motion until it reaches microswitch 232. Microswitch 232 is a combination, double poled, microswitch normally closed and normally open 232a, 232b, respectively. The normally closed section 232a will open upon contact with the carriage which is now in its bottommost position (column B) and will remove the voltage from relay coil 236, thereby putting the vertical drive motor back into its normal upward mode. Also, microswitch 232b, normally open, will energize relay coil 226. Upon energizing relay coil 226, contacts 226b, normally open, will close in parallel with microswitch 232b thereby maintaining voltage on relay 226 when the carriage moves away from microswitch 232b.

Upon energizing relay coil 226 contacts 226c, normally open, will close thereby energizing relay 224 placing voltage on the horizontal mode, as previously described. Contacts 226a will reverse the horizontal motor to move the carriage in alignment with column A.

Relay coil 226 will reverse the horizontal drive motor, thereby driving the horizontal unit until it reaches microswitch 233 at the bottom righthand side of the travel and the travel will therefore be repeated. As the carriage moves at the bottom of its travel back to the column A position, at its furthest position it will engage microswitch 233 which is normally closed. The normally closed terminals will open, thereby deenergizing relays 226 and 224 which, in turn, put the horizontal and vertical drive system back to its normal mode of operation.

Simultaneously with the operation of the pin select solenoids 210a, 210b, 211a, or 211b, switch 219a or 219b is closed whereby a pulse is generated which energizes the subtract relay coil 216 of the accumulator. Therefore, for every play "made," the accumulator is backed up one step. With this system of selection, any number of coins can be placed in the unit and the selections can be "made" in any sequence until the total number of coins deposited in the machine have been utilized.

The pin 154 that has been depressed in the internal panel by the solenoid plunger serves two functions. Firstly, it operates as a switch 218a . . . 218n activating the search system through relay 221 while closing switch 221a to energize the search motors. Secondly, the head 158 of the pin in an activated position protrudes physically behind the button panel. As the mechanism searches, reed relay switch 272 is brought into position with a magnet which generates a very sharp field of focus. The magnet is held proximate to but not in physical contact with the reed relay pole piece. The magnet is held in this position by the contact of the back of the magnet surface (which is shaped in the form of a cam) in physical contact with the protruding head of the pin. The cam-shaped rear of the magnet and the button head are designed to have a single discreet point of contact. When the magneic switch is thus energized, the following actions occur:

(a) The magnetic reed switch energizes the latch coil 275 of latching relay;

(b) The latching relay, in turn, closes contact 275a which energizes the index solenoid 270 physically locking the cartridge carriage in index position and; in turn (c) Actuates microswitch 228a to disconnect the search motors 84 and 106;

(d) Simultaneously contact 275b closes providing voltage through microswitch 280 to activate the cartridge drive motor.

When the cartridge insertion motor 112 is energized, it in turn operates the cam 229 which actuates microswitch 270. Microswitch 270 momentarily energizes solenoid 271 which pushes the cartridge out of the carriage and into the gear driven mechanism. By virtue of the rotation of the cartridge insertion motor, the cartridge is moved forward in the mechanism. When the cartridge reaches its full forward travel, microswitch 334 is energized, in turn energizing solenoid 336 which is the solenoid that pivots the capstan drive 75 and projection mirror 74 into position. Button reset solenoid 374 is in parallel with solenoid 336 and the selection button is thereby set back into its quiescent position.

At the end of travel of capstan and mirror set solenoid 336, microswitch 337 is operated which in turn operates relay 338. Relay 338 is a self-holding relay (through contact 338a). When solenoid 336 operates, it also disconnects the motor 112 from the circuit by opening microswitch 280. When relay 338 operates, it disconnects the injection solenoid 271 and the operational solenoid 336 as well as reverses the connections (through contacts 338a, 338b) to the drive motor 112 so that the motor is now prepared to drive the cartridge outward from the mechanism. Relay 338 closes contacts 338e which applies voltage to one side of the ejection solenoid 376. Contacts 338d remove the voltage from solenoid 336. The capstan and mirror assembly are held in the upward operating position by a mechanical latch 340a. Switch 342 is closed to actuate the projection mechanism.

At the end of the film or whenever else the viewing is to be terminated, there is provided a sensing notch and/or a metallic strip on the film. A pulse is received by this sensing system 360 energizing solenoid 340 to unlatch the capstan assembly. The capstan assembly is unlatched and due to the spring tension supplied by operational solenoid 336, the capstan assembly returns to its quiescent position (down) which in turn reactivates microswitch 280 electrically reinserting the motor 112 into the circuit. Due to the previous action of relay 338, the motor 112 now operates in reverse, driving the cartridge out of the mechanism.

The sensing system 360 employs an R-C charging circuit 361, relay 362 and contacts 363. When the foil is across contacts 363, the R-C circuit capacitor charges until solenoid 326 is actuated. This provides a time delay which prevents the premature release of latch 340a if a cartridge upon insertion has the conductive foil exposed.

Switch 342 is latched closed by latch 340a. Thus solenoid 341 is energized and closes contacts 341a to energize the projection lamp 70. Contacts 341b connect the speaker 344 to amplifier 345. Amplifier 345 is fed by magnetic pickup 346.

Microswitch 364 momentarily energizes due to the action of cam 229b (FIG. 21) on the horizontal drive shaft assembly and, in turn, activates ejection solenoid 376 and a cam attached to the shaft of solenoid 376 actuates microswitch 366. Switch 366 activates the release coil 275a of latch relay 275 which brings the entire electrical system back to its quiescent position. When another selection button is depressed, the system will commence searching again.

There has been disclosed heretofore the best embodiment of the invention presently contemplated and it is to be understood that various changes and modifications may be made by those skilled in the art without departing from the spirit of the invention.

What is claimed is:

1. A multiprogram reproduction system comprising, in combination:
    (a) a housing;
    (b) program selection means operable externally of said housing;
    (c) program reproduction means disposed within said housing at a projection station;
    (d) an elevator vertically movable within said housing;
    (e) a plurality of endless film cartridges removably carried by said elevator in a vertical stack, each of said cartridges representing a program;
    (f) means to drive the film in said cartridges past said program reproduction means;
    (g) transport means arranged to move a selected cartridge between said elevator and the projection station, the movement of said cartridge being in a plane perpendicular to the movement of said elevator; and
    (h) means to energize said program reproduction means when said selected cartridge is at the projection station.

2. The system in accordance with claim 1 wherein said elevator comprises:
    (a) vertical guide means rigidly secured within said housing;
    (b) a frame member slidably mounted on said guide means and vertically movable with respect thereto;
    (c) a plurality of horizontally positioned pockets in said elevator, said pockets being dimensioned to slidably receive said cartridges; and
    (d) motor means arranged to drive said elevator along a vertical path.

3. The system in accordance with claim 2 including a carriage horizontally movable with respect to said elevator, said pockets being arranged in at least two vertical stacks in said carriage and motor means arranged to drive said carriage along a horizontal path.

4. The system in accordance with claim 1 including indexing means arranged to move said elevator in step-by-step vertical increments, said indexing means being responsive to said program selection means, whereby said selected cartridge is placed in opposition to said projection means at the projection station.

5. The system in accordance with claim 1 wherein said indexing means comprises a toothed member integral with said elevator and a pawl adapted to engage said toothed member, said pawl being responsive to the operation of said program selection means.

6. The system in accordance with claim 1 wherein each of said cartridges includes gear means integral therewith and said transport means is a gear train, a portion of which is in meshing engagement with said cartridge gear means, said gear train being responsive to the operation of said program selection means and cartridge drive means to move said selected cartridge between said elevator and the projection station.

7. The system in accordance with claim 6 wherein said drive means comprises a reversible motor connected to said gear train, said motor being responsive to the operation of said program selection means.

8. The system in accordance with claim 6 wherein said cartridge gear means is a rack gear integrally secured to each of said cartridges and the portion of said gear train in meshing engagement therewith is a spur gear actuated by said cartridge drive means.

9. The system in accordance with claim 6 including first auxiliary drive means adapted to move said cartridge from said elevator into meshing engagement with said cartridge drive means and second auxiliary drive means adapted to move said cartridge from said meshing engagement with said cartridge drive means to said elevator.

10. The system in accordance with claim 9 wherein said first and second auxiliary drive means are solenoids responsive to the operation of said program selection means.

11. The system in acordance with claim 1 wherein said program reproduction means is an image projector and wherein there is included a viewing screen arranged to receive the program reproduced by said projector.

12. In a multiprogram reproduction system having means to select a particular program, means to reproduce the program at a projection station, a vertically movable elevator, a plurality of endless film cartridges removably carried by said elevator in a vertical stack, means to drive the film in said cartridges past the program reproduction means, means to transport a selected cartridge and means to energize said reproduction means when said selected cartridge is at the projection station, the improvement comprising gears means integral with each of said cartridges and wherein said transport means is a gear train, a portion of which is in meshing engagement with said cartridge gear means, said gear train being responsive to the operation of said program selection means and cartridge drive means to move said selected cartridge between said elevator and the projection station.

13. The system in accordance with claim 12 wherein said drive means comprises a reversible motor connected to said gear train, said motor being responsive to the operation of said program selection means.

14. The system in accordance with claim 12 wherein said cartridge gears means in a rack gear integrally secured to each of said cartridges and the portion of said gear train in meshing engagement therewith is a spur gear actuated by said cartridge drive means.

15. The system in accordance with claim 12 including first auxiliary drive means adapted to move said cartridge from said elevator into meshing engagement with said cartridge drive means and second auxiliary drive means adapted to move said cartridge from said meshing engagement with said cartridge drive means to said elevator.

16. The system in accordance with claim 12 wherein said first and second auxiliary drive means are solenoids responsive to the operation of said program selection means.

17. The system in accordance with claim 16 wherein said program reproduction means is an image projector and wherein there is included a viewing screen arranged to receive the program reproduced by said projector.

18. Selection means for a multiprogram projector, said selection means comprising:
    (a) an elevator having a plurality of chambers arranged to receive recorded media defining portions of the multiprogram;
    (b) a magnet associated with each said chamber, said magnets being arranged in a stationary vertical row to enable said elevator to move vertically with respect to said row of magnets;
    (c) means to selectively move one of said magnets into and out of a sensing zone;
    (d) magnetically actuated sensing means carried by said elevator for vertical movement in unison therewith past said vertical row of magnets, said sensing means being arranged for actuation by a said magnet within the sensing zone; and
    (e) circuit means connected to said sensing means and controlled thereby for stopping motion of the elevator whenever a said magnet is sensed.

19. The apparatus of claim 18 including carriage means responsive to the stopping of said elevator, said carriage means being arranged to transversely index said elevator whereby one of the chamber thereof is positioned proximate to a utilization apparatus.

20. The apparatus of claim 18 including transfer means arranged to move a selected recording medium along a path between its respective chamber and a utilization device when the chamber is proximate to the utilization apparatus.

21. The apparatus of claim 18 including:
(a) support means slidably holding said magnets;
(b) a pin associated with each of said slidably mounted magnets;
(c) means for slidably moving a selected one of said pins;
(d) electrical contact means closed by the movement of said selected pin; and
(e) elevator drive means energized by the closing of said contact means.

22. The apparatus of claim 18 wherein said means to move said pins axially is a solenoid.

23. The apparatus of claim 18 wherein said elevator carries at least two vertical rows of the recording mediums and wherein the closing of one of said contacts causes said elevator to move in an $x-y$ search pattern until a said magnet in the sense zone is detected and wherein said means for moving the magnet returns said sensed magnet from the nonsensing zone to a storage zone.

References Cited
UNITED STATES PATENTS

| | | | |
|---|---|---|---|
| 2,214,468 | 9/1940 | Lannerd | 352—8 |
| 2,334,547 | 11/1943 | Esper | 352—8 |
| 3,139,788 | 7/1964 | Hughes et al. | |
| 3,164,059 | 1/1965 | Turrentine. | |
| 3,383,156 | 5/1968 | Fried et al. | |

JULIA E. COINER, Primary Examiner

U.S. Cl. X.R.

352—6